(12) United States Patent
Jansson (10) Patent No.: US 8,195,168 B2
(45) Date of Patent: Jun. 5, 2012

(54) MECHANISM FOR CONTROLLING A TRANSMISSION OF DATA MESSAGES TO USER EQUIPMENT BY AN EXTERNAL GATEWAY

(75) Inventor: Jari Jansson, Espoo (FI)

(73) Assignee: Nokia Corporation (FI)

( * ) Notice: Subject to any disclaimer, the term of this patent is extended or adjusted under 35 U.S.C. 154(b) by 549 days.

(21) Appl. No.: 11/654,573

(22) Filed: Jan. 18, 2007

(65) Prior Publication Data
US 2007/0184860 A1 Aug. 9, 2007

Related U.S. Application Data

(60) Provisional application No. 60/764,789, filed on Feb. 3, 2006.

(51) Int. Cl.
*H04Q 7/20* (2006.01)
(52) U.S. Cl. ......... 455/445; 455/403; 455/466; 370/335
(58) Field of Classification Search .................. 455/445, 455/403, 466
See application file for complete search history.

(56) References Cited

U.S. PATENT DOCUMENTS

| 6,311,190 | B1 * | 10/2001 | Bayer et al. ........................ 1/1 |
| 7,539,502 | B2 * | 5/2009 | Lovell, Jr. ..................... 455/466 |
| 7,546,132 | B2 * | 6/2009 | Lee et al. ....................... 455/503 |
| 7,734,302 | B2 * | 6/2010 | Alfano et al. .................. 455/466 |
| 2002/0090950 | A1 * | 7/2002 | Uskela ........................... 455/445 |
| 2002/0155834 | A1 * | 10/2002 | Olmstead et al. ............. 455/433 |
| 2003/0185178 | A1 | 10/2003 | Chitrapu et al. |
| 2004/0131014 | A1 * | 7/2004 | Thompson et al. ........... 370/230 |
| 2005/0043011 | A1 * | 2/2005 | Murray et al. ................ 455/405 |
| 2005/0282565 | A1 * | 12/2005 | Shaheen ........................ 455/466 |
| 2007/0111723 | A1 * | 5/2007 | Ahmed et al. ............. 455/426.1 |
| 2007/0298817 | A1 * | 12/2007 | Alfano et al. ................. 455/466 |

FOREIGN PATENT DOCUMENTS

JP 2006-020369 A 1/2006

OTHER PUBLICATIONS

3GPP TS 23.204 V1.0.0, "$3^{RD}$ Generation Partnership Project; Technical Specification Group Services and System Aspects; Support of SMS and MMS Over Generic 3GPP IP Access; Stage 2 (Release 7)", XP-002433547, Nov. 2005, pp. 1-13.
3GPP TS 29.002 V7.2.0, "$3^{RD}$ Generation Partnership Project; Technical Specification Group Core Network and Terminals; Mobile Application Part (MAP) Specification; (Release 7)", Dec. 2005, pp. 1-1289.

(Continued)

*Primary Examiner* — Charles Shedrick
(74) *Attorney, Agent, or Firm* — Alston & Bird LLP (57) ABSTRACT

A mechanism for controlling a transmission of data messages in a communication network, including executing a registration procedure, sending a request message including registration information from a message gateway entity to a home subscriber database by using a Mobile Application Part signaling, wherein the request message further comprises information elements including registration and address data related to the message gateway entity, storing the registration information and information elements in the home subscriber database, and using the stored registration information and information elements for responding, by the home subscriber database, to a routing information request for transmitting a data message to a destination connected to the message gateway entity.

34 Claims, 9 Drawing Sheets

OTHER PUBLICATIONS

3GPP TS 23.040 V6.6.0, "*3$^{RD}$ Generation Partnership Project; Technical Specification Group Terminals; Technical Realization of the Short Message Service (SMS); (Release)*", Dec. 2005, pp. 1-186.

3GPP TS 23.008 V6.8.0, "*3$^{RD}$ Generation Partnership Project; Technical Specification Group Core Network and Terminals; Organization of Subscriber Data (Release 6)*", Dec. 2005, pp. 1-69.

3GPP TS 23.078 V7.2.0, "*3$^{RD}$ Generation Partnership Project; Technical Specification Group Core Network; Customised Applications for Mobile Network Enhanced Logic (CAMEL) Phase 4; Stage 2 (Release 7)*", Dec. 2005, pp. 1-736.

3GPP TR 23.804 V7.1.0, "*3$^{rd}$ Generation Partnership Project; Technical Specification Group Services and System Aspects; Support of SMS and MMS Over Generic 3GPP IP Access (Release 7)*", Sep. 2005, pp. 1-25.

Office Action for Application No. JP 2008-546828 dated Jan. 27, 2011.

First Office Action for Chinese Application No. 200780001760.2 dated Jun. 24, 2011.

3GPP TS 23.204 V1.0.0 (Nov. 2005); Technical Specification; 3rd Generation Partnership Project; Technical Specification Group Services and System Aspects; Support of SMS and MMS over generic 3GPP IP access; Stage 2 (Release 7).

3GPP TS 23.078 V7.2.0 (Dec. 2005); Technical Specification; 3rd Generation Partnership Project; Technical Specification Group Core Network; Customised Applications for Mobile network Enhanced Logic (CAMEL) Phase 4; Stage 2 (Release 7).

Non-Compliance with Substantive Requirements and Invitation to Submit Observations and/or Amended Application for African Patent Application No. AP/P/2008/004484, filed Jan. 22, 2007.

European Telecommunications Standards Institute: "3$^{rd}$ Generation Partnership Project, Technical Specification Group Services and System Aspects, Support of SMS and MMS over generic 3GPP IP access, Stage 2 (Release 7)", Nov. 2005, pp. 1-13, XP002433547; Downloaded at http://www.3gpp.org/ftp/Specs/archive/23_series/23.204-100.

European Telecommunications Standards Institute: "3$^{rd}$ Generation Partnership Project", vol. 3-SA2, Sep. 2005, XP014031515, paragraphs 5.1, 8.1, 8.2, 8.4, 8.7, 8.10; Downloaded at http://www.quintillion.co.jp/3GPP/Specs/23804-710.pdf.

Notice of Preliminary Rejection in Application No. KR 2008-7018996 dated May 9, 2010.

\* cited by examiner

```
AnyTimeModificationArg ::= SEQUENCE {
    subscriberIdentity              [0]  SubscriberIdentity,
    gsmSCF-Address                  [1]  ISDN-AddressString,
    modificationRequestFor-CF-Info  [2]  ModificationRequestFor-CF-Info  OPTIONAL,
    modificationRequestFor-CB-Info  [3]  ModificationRequestFor-CB-Info  OPTIONAL,
    modificationRequestFor-CSI      [4]  ModificationRequestFor-CSI      OPTIONAL,
    extensionContainer              [5]  ExtensionContainer              OPTIONAL,
    longFTN-Supported               [6]  NULL                            OPTIONAL,
    ...,
    modificationRequestFor-ODB-data [7]  ModificationRequestFor-ODB-data OPTIONAL,
    modificationRequestFor-SM-GW-data [x] ModificationRequestFor-SM-GW-data OPTIONAL}
```

```
AnyTimeModificationRes ::= SEQUENCE {
    ss-InfoFor-CSE             [0]  Ext-SS-InfoFor-CSE         OPTIONAL,
    camel-SubscriptionInfo     [1]  CAMEL-SubscriptionInfo     OPTIONAL,
    extensionContainer         [2]  ExtensionContainer         OPTIONAL,
    ...,
    odb-Info                   [3]  ODB-Info                   OPTIONAL }
```

```
ModificationRequestFor-SM-GW-data ::= SEQUENCE {
    sm-gw-NodeType           [0]  RequestingNodeType         OPTIONAL,
    modifyRegistrationStatus [1]  ModificationInstruction    OPTIONAL,
    extensionContainer       [2]  ExtensionContainer         OPTIONAL,
    ...}
```

```
RequestingNodeType ::= ENUMERATED {
    vlr   (0),
    sgsn  (1),
    msc   (2),
    ...}
    -- exception handling:
    -- received values in the range 32-15 shall be treated as "vlr"
    -- received values greater than 15 shall be treated as "sgsn"
```

```
ModificationInstruction ::= ENUMERATED {
    deactivate    (0),
    activate      (1) }
```

```
RoutingInfoForSM-Arg ::= SEQUENCE {
    msisdn                 [0] ISDN-AddressString,
    sm-RP-PRI              [1] BOOLEAN,
    serviceCentreAddress   [2] AddressString,
    extensionContainer     [6] ExtensionContainer    OPTIONAL,
    ... ,
    gprsSupportIndicator   [7] NULL                  OPTIONAL,
    -- gprsSupportIndicator is set only if the SMS-GMSC supports
    -- receiving of two numbers from the HLR
    sm-RP-MTI              [8] SM-RP-MTI             OPTIONAL,
    sm-RP-SMEA             [9] SM-RP-SMEA            OPTIONAL,
    sm-gw-SupportIndicator [x] NULL                  OPTIONAL }
```

```
RoutingInfoForSM-Res ::= SEQUENCE {
    imsi                   IMSI,
    locationInfoWithLMSI   [0] LocationInfoWithLMSI,
    extensionContainer     [4] ExtensionContainer    OPTIONAL,
    ...}
```

FIG. 6a

```
LocationInfoWithLMSI ::= SEQUENCE {
    networkNode-Number              [1] ISDN-AddressString,
    lmsi                            LMSI                        OPTIONAL,
    extensionContainer              ExtensionContainer          OPTIONAL,
    ...,
    gprsNodeIndicator               [5] NULL                    OPTIONAL,
    -- gprsNodeIndicator is set only if the SGSN number is sent as the
    -- Network Node Number
    additional-Number               [6] Additional-Number       OPTIONAL,
    -- NetworkNode-number can be either msc-number or sgsn-number
    sm-gw-Address                   [x] ISDN-AddressString      OPTIONAL,
    sm-gw-NodeType                  [x] RequestingNodeType      OPTIONAL,
    sm-gw-NodeIndicator             [x] NULL                    OPTIONAL}
    -- sm-gw-NodeIndicator is set only if the SM-GW address is sent as the
    -- Network Node Number
```

MECHANISM FOR CONTROLLING A TRANSMISSION OF DATA MESSAGES TO USER EQUIPMENT BY AN EXTERNAL GATEWAY

REFERENCE RELATED APPLICATION

This Application hereby claim the benefit under 35 USC 119(e) of U.S. provisional patent application Ser. No. 60/764,789, filed Feb. 3, 2006. The disclosure of the prior application is hereby incorporated by reference herein in its entirety.

BACKGROUND OF THE INVENTION

1. Field of the Invention

The present invention relates to a mechanism for controlling a transmission of data messages, in particular of short messages of a short message service (SMS), in a communication network. In particular, the present invention relates to a method of controlling a transmission of data messages to a user equipment (UE) by an external short message gateway entity (SM-GW), a corresponding message gateway entity, a corresponding home subscriber database, such as a Home Location Register (HLR) or Home Subscriber Server (HSS), a corresponding system and a corresponding computer program product, which are usable for controlling a message transmission by providing corresponding routing information which are provided by means of a registration procedure.

For the purpose of the present invention to be described herein below, it should be noted that a user equipment may for example be any device by means of which a user may access a communication network; this implies mobile as well as non-mobile devices and networks, independent of the technology platform on which they are based; only as an example, it is noted that communication equipments operated according to principles standardized by the $3^{rd}$ Generation Partnership Project 3GPP and known for example as UMTS terminals are particularly suitable for being used in connection with the present invention;

although reference was made herein before to short messages, this exemplifies only a specific example of message type having a particular content; content as used in the present invention is intended to mean also multimedia data of at least one of audio data, video data, image data, text data, and meta data descriptive of attributes of the audio, video, image and/or text data, any combination thereof or even, alternatively or additionally, other data such as, as a further example, program code of an application program to be accessed/downloaded;

method steps likely to be implemented as software code portions and being run using a processor at one of the entities described herein below are software code independent and can be specified using any known or future developed programming language;

method steps and/or devices likely to be implemented as hardware components at one of the entities are hardware independent and can be implemented using any known or future developed hardware technology or any hybrids of these, such as MOS, CMOS, BiCMOS, ECL, TTL, etc, using for example ASIC components or DSP components, as an example;

generally, any method step is suitable to be implemented as software or by hardware without changing the idea of the present invention;

devices or means can be implemented as individual devices or means, but this does not exclude that they are implemented in a distributed fashion throughout the system, as long as the functionality of the device is preserved.

2. Related Prior Art

In the last years, an increasingly extension of communication networks, e.g. of wire based communication networks, such as the Integrated Services Digital Network (ISDN), or wireless communication networks, such as the cdma2000 (code division multiple access) system, cellular 3rd generation (3G) communication networks like the Universal Mobile Telecommunications System (UMTS), cellular 2nd generation (2G) communication networks like the Global System for Mobile communications (GSM), the General Packet Radio System (GPRS), the Enhanced Data Rates for Global Evolutions (EDGE), or other wireless communication system, such as the Wireless Local Area Network (WLAN), took place all over the world. Various organizations, such as the $3^{rd}$ Generation Partnership Project (3GPP), the International Telecommunication Union (ITU), $3^{rd}$ Generation Partnership Project 2 (3GPP2), Internet Engineering Task Force (IETF), and the like are working on standards for telecommunication network and multiple access environments.

In general, the system structure of a communication network is such that one party, e.g. a subscriber's communication equipment, such as a mobile station, a mobile phone, a fixed phone, a personal computer (PC), a laptop, a personal digital assistant (PDA) or the like, is connected via transceivers and interfaces, such as an air interface, a wired interface or the like, to an access network subsystem. The access network subsystem controls the communication connection to and from the communication equipment and is connected via an interface to a corresponding core or backbone network subsystem. The core (or backbone) network subsystem switches the data transmitted via the communication connection to a destination party, such as another communication equipment, a service provider (server/proxy), or another communication network. It is to be noted that the core network subsystem may be connected to a plurality of access network subsystems. Depending on the used communication network, the actual network structure may vary, as known for those skilled in the art and defined in respective specifications, for example, for UMTS, GSM and the like.

Generally, for properly establishing and handling a communication connection between network elements such as the user equipment (or subscriber terminal) and another communication equipment or terminal, a database, a server, etc., one or more intermediate network elements, such as network control elements, support nodes or service nodes are involved. Network control elements, such as a Mobile Switching Center (MSC), a Serving GPRS Support Node (SGSN) or the like, are responsible for controlling the call establishment, call control, call termination, and the like.

Since more and more communication network systems, such as circuit switched (CS) networks, packet switched (PS) networks, Internet Protocol (IP) based networks, for example IP Multimedia Subsystem (IMS), and the like are established in parallel, the provision of an interconnection between these network systems for enabling the continuation of calls of a subscriber or the exchange of messages like SMS, gets an increased relevance. In this connection, it is necessary to ensure that, for example, message transmissions are routed correctly to a destination.

In the case of a 3GPP based network, such as a 2G or 3G telecommunication network (GSM/UMTS), currently, a transmission of a mobile terminated short message in the corresponding GSM/UMTS core networks is possible only via MSCs or SGSNs for routing of the short message towards a subscriber. Routing information is normally retrieved by the core network elements from a database, such as a HLR or HSS.

There are emerging, however, requirements that the sending of the short message is also possible by using some external (from GSM/UMTS core networks point of view) gateways. An example for such a requirement is presented in the 3GPP specification TS 23.204 (Support of SMS and MMS over generic 3GPP IP access), V1.0.0.

In this document, capabilities and enhancements needed to support SMS over a generic IP Connectivity Access Network (IP-CAN) using IMS capabilities are specified. In particular, there is described to use an IP Short Message Gateway (IP-SM-GW) which provides the protocol interworking for delivery of the short message between an IP-based UE and the Short Message Service Center (SMSC). The functions of this element are to connect to the Gateway MSC (GMSC) wherein it appears to the SMS-GMSC as an MSC or SGSN, to connect to a SMS Interworking MSC (SMS-IWMSC) using established MAP protocols, wherein it appears to the SMS-IWMSC as an MSC or SGSN, to communicate with the UE using IMS messaging as transport while maintaining the format and functionality of the SMS message, to acquire knowledge of the association between the MSISDN and the IP address of the terminal, and to act as an Application Server (AS) towards the IMS core. In order to support such a SMS over generic IP access, the HSS shall support the following functions: storing the address of the IP-SM-GW and providing it as part of a "send routing information for short message" procedure, and an indication that the terminal is registered with an IP-SM-GW for delivery of SMS. In order to be able to return the address of the IP-SM-GW in response to a "SendRoutingInfoForShortMsg" request from the SMS-GMSC, the HSS needs to have an indication that the terminal is registered with an IP Short Message Gateway and that this is the preferred method for delivery of short messages. The IP-SM-GW is informed of the UE's registration status in the IMS. On registration, the IP-SM-GW sends a message to the HSS indicating that the UE has successfully registered.

For the registration or deregistration procedure for the UE and the IP-SM-GW, according to the TS23.204 specification, it is specified to use IP-SM-GW-(De)register Request and IP-SM-GW (De)Register Response over a Sh interface for (de)registration. The Sh interface is provided between the IP-SM-GW and the HSS and allows the HSS to be informed that the user is capable of receiving SMS over IMS. MSC or SGSN addresses are updated in the HLR in connection with a location update or the like.

However, 3GPP standards do not 'separate' HLR and HSS. This means that the HSS, according the 3GPP, comprise both functionality sets. In practice, however, it is possible and often the case that HLR and HSS are different network elements. So, if the IP-SM-GW address is sent to HSS via the Sh interface, as defined in the present art, then it is necessary to provide proprietary solution for delivering the address further to HLR. It is to be noted that this address is particularly needed in the HLR. Furthermore, the Sh interface is based on Diameter protocol F and is thus a vendor specific Diameter application. Hence, the network structure can become more complex and thus more expensive.

SUMMARY OF THE INVENTION

Thus, it is an object of the invention to provide an improved mechanism for controlling a message transmission in a communication network. In particular, it is an object of the present invention to provide a mechanism which enables a data message via an external message gateway entity to a user equipment wherein the routing information needed are made available in a suitable manner.

This object is achieved by the measures defined in the attached claims.

In particular, according to one aspect of the proposed solution, there is provided, for example, a method of controlling a transmission of data messages in a communication network, the method comprising steps of executing a registration procedure, sending a request message including registration information from a message gateway entity to a home subscriber database by using a Mobile Application Part signaling, wherein the request message further comprises information elements including registration and address data related to the message gateway entity, storing the registration information and information elements in the home subscriber database, and using the stored registration information and information elements for responding, by the home subscriber database, to a routing information request for transmitting a data message to a destination connected to the message gateway entity.

Furthermore, according to one aspect of the proposed solution, there is provided, for example, a message gateway entity usable for a transmission of data messages in a communication network, the message gateway entity being operationally connected and configured to participate in a registration procedure, to send a request message including registration information to a home subscriber database by using a Mobile Application Part signaling, wherein the message gateway entity is configured to include in the request message information elements including registration and address data related to the message gateway entity.

Moreover, according to one aspect of the proposed solution, there is provided, for example, a home subscriber database (such as a HLR) usable for controlling a transmission of data messages in a communication network, the home subscriber database being operationally connected and configured to receive a request message including registration information from a message gateway entity by means of a Mobile Application Part signaling is used, wherein the request message further comprises information elements including registration and address data related to the message gateway entity, to store the registration information and information elements in the home subscriber database for executing a registration procedure, and to use the stored registration information and information elements for responding to a routing information request for transmitting a data message to a destination connected to the message gateway entity.

In addition, according to one aspect of the proposed solution, there is provided, for example, a computer program product for a computer, comprising software code portions for making, when said product is run on the computer, said computer to function as a message gateway entity usable for a transmission of data messages in a communication network, wherein the computer program product is configured to execute steps of participating in a registration procedure, sending a request message including registration information to a home subscriber database by using a Mobile Application Part signaling, and including in the request message information elements including registration and address data related to the message gateway entity control element usable for controlling a call management for a subscriber.

Similarly, according to one aspect of the proposed solution, there is provided, for example, a computer program product for a computer, comprising software code portions for making, when said product is run on the computer, said computer to function as a home subscriber database usable for controlling a transmission of data messages in a communication network, wherein the computer program product is configured to execute steps of receiving a request message including registration information from a message gateway entity by means of a Mobile Application Part signaling is used, wherein the request message further comprises information elements including registration and address data related to the message gateway entity, storing the registration information and information elements for executing a registration procedure, and using the stored registration information and information elements for responding to a routing information request for transmitting a data message to a destination connected to the message gateway entity.

According to further refinements, the proposed solution may comprise one or more of the following features:

- a MAP-Any-Time-Modification request message may be used as the request message of the Mobile Application Part signaling;
- the information elements may be comprised in a modification request for message gateway entity parameters;
- the address data related to the message gateway entity may be included in the request message as a separate information element; alternatively, the address data related to the message gateway entity may be included in the request message in connection with an existing information element re-used for the message gateway entity related information;
- the information elements related to the message gateway entity may further comprise an information element indicating whether or not the message gateway entity is adapted to provide functionalities of a core network control element of a communication network;
- for the usage of the stored registration information and information elements for responding, by the home subscriber database, to a routing information request for transmitting a data message to a destination connected to the message gateway entity, only the registration information and information elements related to the message gateway element may be sent in response to the request for routing information; alternatively, for the usage of the stored registration information and information elements for responding, by the home subscriber database, to a routing information request for transmitting a data message to a destination connected to the message gateway entity, the registration information and information elements related to the message gateway element and registration information and address data related to at least one core network control element existing in the communication network may be sent in response to the request for routing information;
- when executing a deregistration procedure, a request message including deregistration information may be sent from the message gateway entity to the home subscriber database by using a Mobile Application Part signaling, wherein the request message further comprises information elements including deregistration data related to the message gateway entity, the stored registration information and information elements may be removed in the home subscriber database, and a response message to the request message may be sent from the home subscriber database to the message gateway element indicating completion of the deregistration; again, a MAP-Any-Time-Modification request message may be used as the request message of the Mobile Application Part signaling; moreover, the information elements may be comprised in a modification request for message gateway entity parameters;
- the data massage may be a short message of a short message service.

By virtue of the proposed solutions, the following advantages can be achieved. It is possible to use also other routing mechanisms than those which are currently available, such as Circuit Switched (CS)/Packet Switched (PS) routing, for mobile terminated SM sending. An external SM-GW according to the present invention can be any external gateway, not only an IP based IP-SM-GW as specified in TS 23.204. Furthermore, the mechanism according to the present invention could be used also for other purposes, for example, if there is a requirement to route the MT-SM through some external node before sending it towards the visited network. This means that a message, such as a short message, can be routed to an external gateway, for example, for checking or further actions taken to the SMS before it is sent further. This may comprise, for example, a provision of a new capability such as SMS Forwarding, changing the recipient, performing a check of the short message with regard to short message spamming (also of spook, spoof or fake short messages) and filtering thereof, provision of an interception point for spoof and fake SMS, and the like.

By means of using the already defined MAP-ANY-TIME-MODIFICATION service for external SM-GW address registration/deregistration, an implementation effort in HLR is small especially if HLR already supports MAP-ANY-TIME-MODIFICATION service. However, it is also possible to use a new MAP service providing the necessary performance.

As mentioned above, 3GPP does not 'separate' HLR and HSS, while in practice, these functions may reside in different network elements. By using the mechanism for registration/deregistration according to the present invention, i.e. by using a MAP protocol (SS7 stack) for sending the data directly to the HLR, it is not necessary to provide proprietary solutions making the system more complex. Furthermore, the data are directly available at the HLR without further signaling or the like which lowers the load of the network.

The above and still further objects, features and advantages of the invention will become more apparent upon referring to the description and the accompanying drawings.

BRIEF DESCRIPTION OF THE DRAWINGS

FIGS. 6a and 6b show an example for parameter changes in MAP message contents to be used for an example illustrating the present invention.

DESCRIPTION OF PREFERRED EMBODIMENTS

In the following, an embodiment of the present invention is described with reference to the drawings. For illustrating the present invention, the preferred embodiment will be described in a 3G network environment comprising mobile access network subsystem and core network subsystem components according to the 3GPP specifications, as well as in a IMS network environment. However, it is to be noted that the present invention is not limited to an application in such a network environments but is also generally applicable in other network types, in particular with regard to the type of the message gateway entity and the network type(s) associated therewith.

Figure 1:
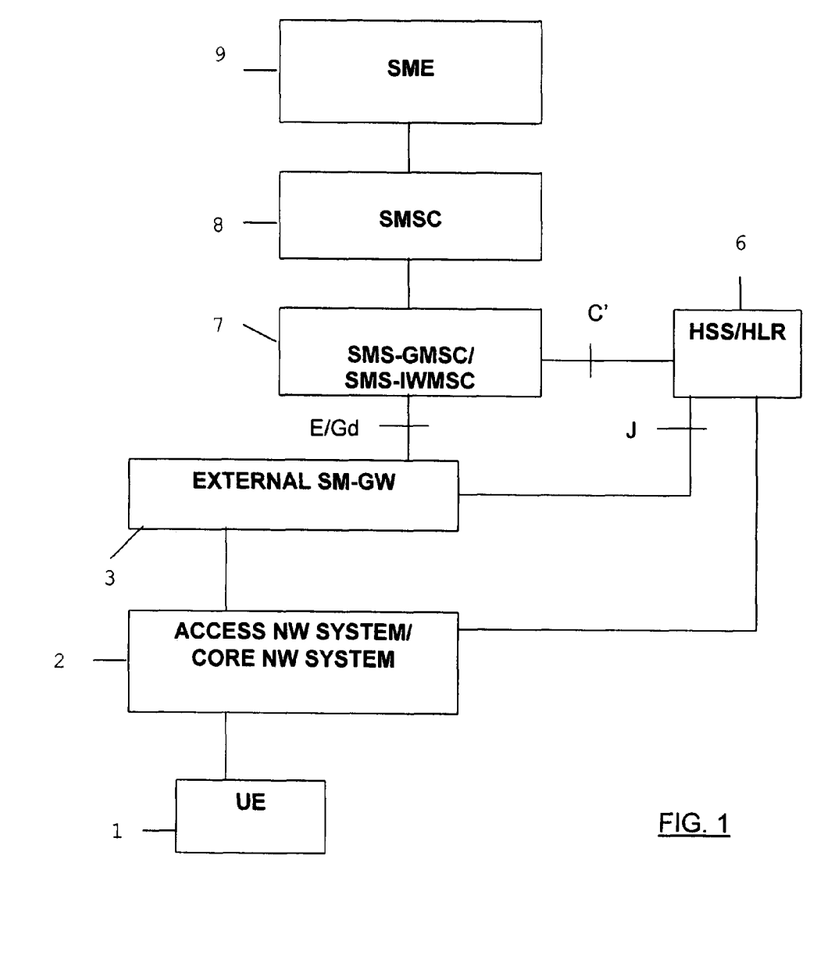
FIG. 1 shows a block diagram illustrating a simplified network structure in which the mechanism according to the present invention is applicable.

In FIG. 1, a schematic block diagram of a basic network environment of a communication network is shown. It is to be noted that the structure according to FIG. 1 represents only a simplified example of an architecture of a communication network environment in which the present invention is applicable. As known by those skilled in the art, there are provided several additional network elements and signaling links used for a communication connection. However, for the sake of simplicity, only those elements are depicted which are necessary for describing the invention.

Furthermore, the network elements and their functions described herein may be implemented by software, e.g. by a computer program product for a computer, or by hardware. In any case, for executing their respective functions, correspondingly used devices, such as a communication equipment, core network control element like a mobile switching centre MSC and associated functions, an access network subsystem element like Radio Access Network RAN element, a message gateway entity such as an external SM-GW, and the like comprise several means and components (not shown) which are required for control, processing and communication/signaling functionality. Such means may comprise, for example, a processor unit for executing instructions, programs and for processing data, memory means for storing instructions, programs and data, for serving as a work area of the processor and the like (e.g. ROM, RAM, EEPROM, and the like), input means for inputting data and instructions by software (e.g. floppy diskette, CD-ROM, EEPROM, and the like), user interface means for providing monitor and manipulation possibilities to a user (e.g. a screen, a keyboard and the like), interface means for establishing links and/or connections under the control of the processor unit (e.g. wired and wireless interface means, an antenna, etc.) and the like. Similar to that, the second network environment associated with the external SM-GW, for example the IMS domain, may comprise several elements and/or functionalities not shown which are known, however, to a person skilled in the art and therefore not described in greater detail herein.

In FIG. 1, reference sign 1 denotes a user equipment communicating with the network for sending and receiving messages, such as a short message. In particular, the following description is directed to a mobile terminating short message sending.

Reference sign 2 denotes access network system/core network system for providing access to the communication network. The access network system/core network system 2 may be, for example, an IMS system comprising several call state control functions (CSCF), in particular Proxy-CSCF (P-CSCF) and Serving-CSCF (S-CSCF). Generally, the access network system/core network system 2 comprises at least one entity having a communication control functionality, such as a S-CSCF, which interacts with network databases, such as a HSS or HLR, for mobility, manages mobile (UE) registration, maintains connections or sessions, and interacts with other services.

Reference sign 3 denotes an external message gateway entity, such as an external SM-GW. The function of this element is generally to send messages, in particular SM, to the UE via the access network system/core network system 2. For this purpose, it is adapted to connect to a Gateway MSC (GMSC) 7, to connect to a SMS Interworking MSC (SMS-IWMSC) 7 using established MAP protocols (in FIG. 1, the SMS-GMSC and the SMS-IWMSC are combined in one element, but they can be also separate elements), to communicate with the UE using the transport mechanism offered by the access network system/core network system 2 while maintaining the format and functionality of the SMS message, to acquire knowledge of the association between the MSISDN and the network address of the terminal, and to act as an Application Server (AS) towards the access network system/core network system 2. Furthermore, it is connected to a home subscriber database 6, such as a HSS or HLR, for registration and subscription purposes, for example. The interface connecting the external SM-GW and the HSS/HLR 6 is, for example, a J interface defined between a gsmSCF (GSM Service Control Function) and the HSS/HLR. The gsmSCF defines the Intelligent Network IN control environment for a mobile network and has been enhanced to enable interworking with GSM/GPRS systems and the like. The gsmSCF also stores the service logic associated with IN services.

The SMS-GMSC/SMS-IWMSC 7 is connected to the external SM-GW by an E/Gd interface which allows the external SM-GW to connect to the SMS-GMSC using MAP. As an option, the external SM-GW can be provided with functionalities of an MSC or SGSN. In such a case, the E/Gd interface allows the external SM-GW to appear to the SMS-GMSC as an MSC or SGSN. A connection of the SMS-GMSC/SMS-IWMSC 7 to the HSS/HLR 7 is provided, for example, by a C' interface for obtaining routing information when a message is to be forwarded. By means of the C' interface, it is to be possible for the HLR to return the external SM-GW address in addition to the MSC and/or SGSN address and/or SM-GW address as routing information to the SMS-GMSC 7.

Reference sign 8 denotes a Short Message Service Centre SMSC which controls the transmission of short messages and forwards them to a destination address. Reference sign 9 denotes a Short Message Entity (SME) which may send and receive short messages (for example, another UE, an application server, another SMSC or the like).

Even not shown in FIG. 1, the external SM-GW may be connected also to charging elements of the networks for transmitting data used for charging.

In the following, a registration procedure according to the present invention in the network of FIG. 1 is described in connection with FIGS. 2a and 3, and a deregistration procedure according to the present invention in the network of FIG. 1 is described in connection with FIGS. 2b and 4.

First, a registration procedure in the message transmission control method according to the present invention is described in connection with FIGS. 2a and 3.

Figure 2A:
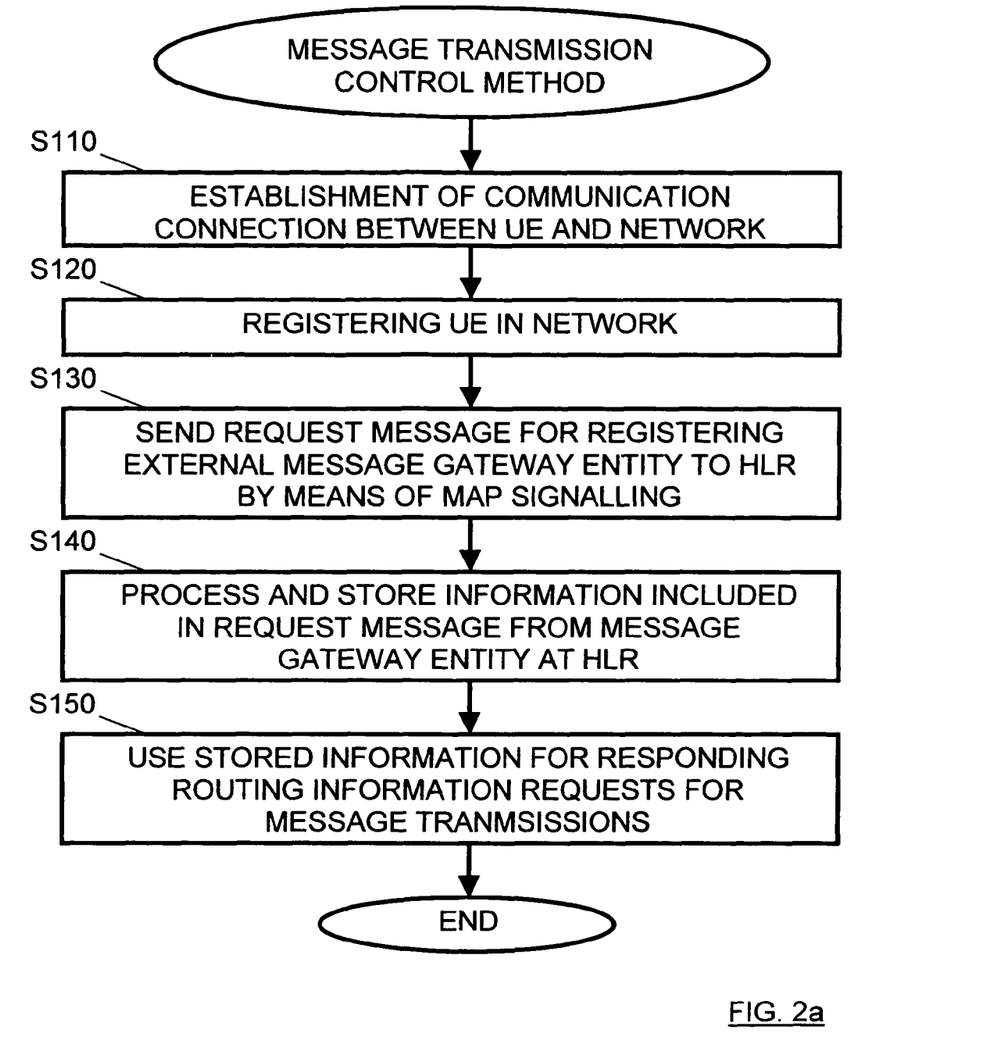
FIG. 2a shows a flow chart illustrating a registration procedure used in the mechanism according to the present invention.
Figure 3:
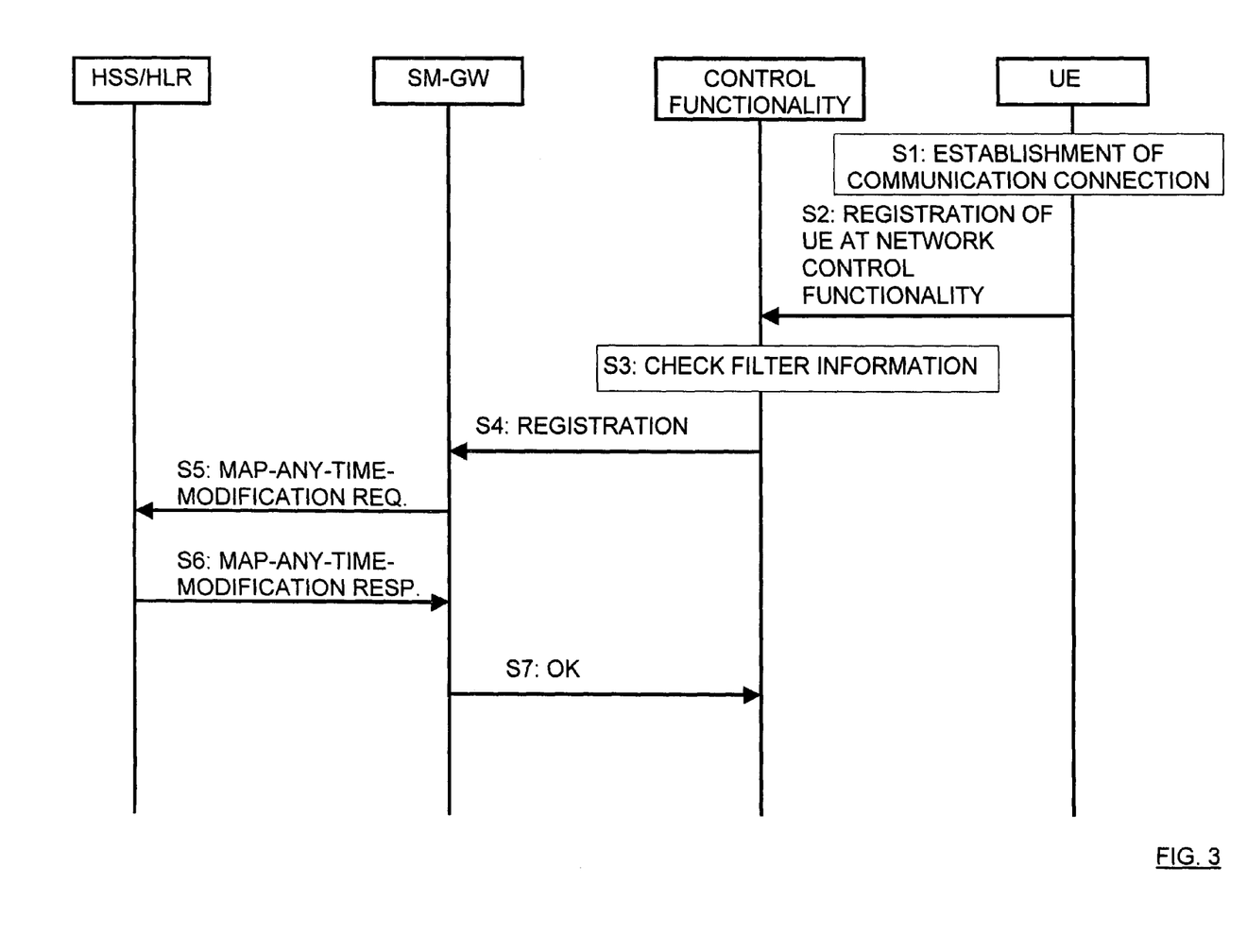
FIG. 3 shows a message flow diagram illustrating the registration procedure according to the present invention.

When the UE starts a communication connection to the network, a first connection is established between the UE 1 and the access NW system/core NW system 2 (step S110 in FIG. 2a, step S1 in FIG. 3). For example, in case the access NW system/core NW system 2 is an IMS, an IP connection is established first. At any time after the establishment of the first connection, the UE 1 registers at the communication control functionality of the access NW system/core NW system 2, for example at the S-CSCF, according to registration procedures for a UE in the corresponding network (step S120 in FIG. 2a, step S2 in FIG. 3). Since these registration procedures are known to those skilled in the art, a detailed description thereof is omitted. Furthermore, it is to be noted that for simplicity not all messages between UE and control functionality (for example, S-CSCF) and between control functionality and the HSS/HLR are shown in detail. In addition, there may be involved further network elements not shown in the registration of the UE, such as a P-CSCF or the like.

During the registration of the UE at the communication control functionality of the access NW system/core NW system 2, the communication control functionality checks filter information retrieved from the HSS/HLR during the registration procedure (step S3 in FIG. 3). After a successful registration at the access NW system/core NW system 2, and based on the retrieved filter information, the communication control functionality informs the external SM-GW, which may appear as an application server to the communication control functionality, for example, about the registration of the UE (step S4 in FIG. 3).

When the external SM-GW is informed about the registration of the UE, it starts an own registration procedure according to the present invention. For this purpose a MAP based service, such as the MAP-ANY-TIME-MODIFICATION service, can be used.

Figure 6B:
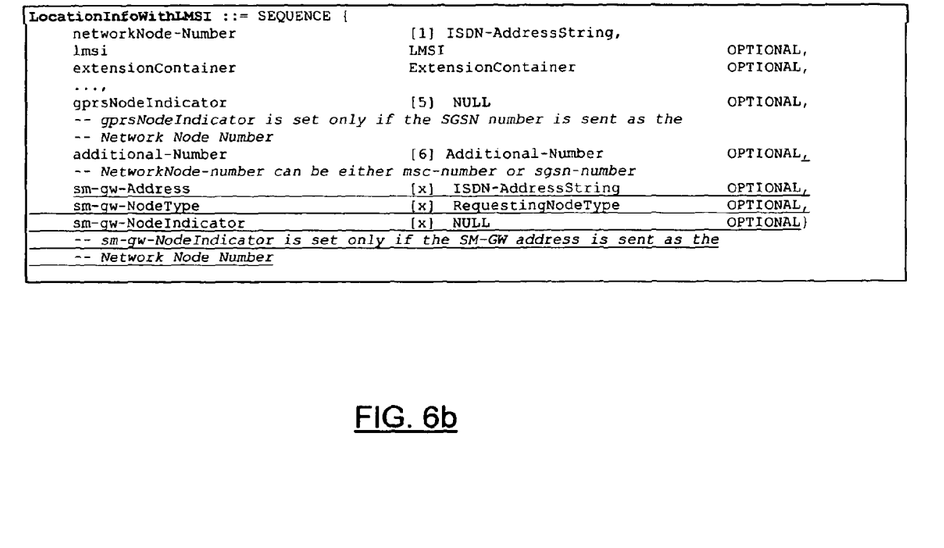
Figure 7:
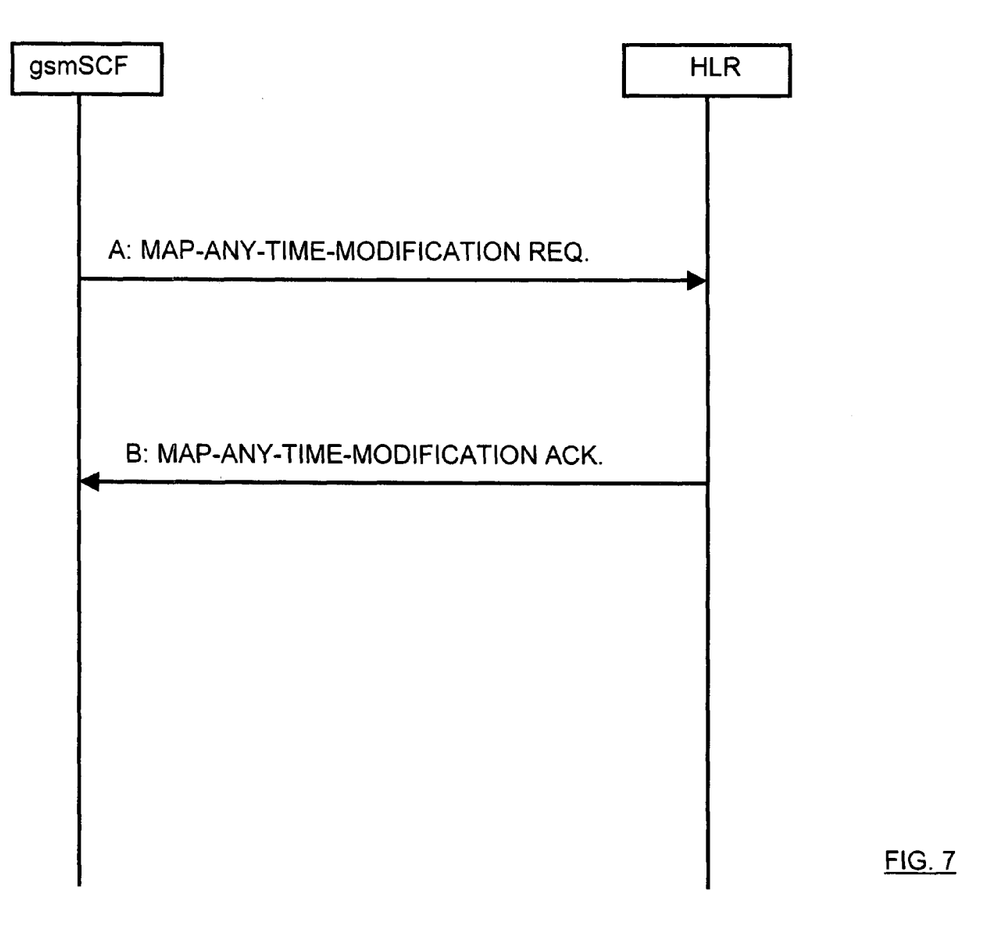
FIG. 7 shows a message flow for a MAP-ANY-TIME-MODIFICATION procedure.

MAP-ANY-TIME-MODIFICATION service is defined for a modification of information of the HLR, such as subscription information. A further definition thereof can be found, for example, in 3GPP specifications TS29.002 V7.2.0 and TS23.078 V7.2.0, and is illustrated in FIG. 7. The MAP-ANY-TIME-MODIFICATION service is used, for example, by CAMEL (Customized Application for Mobile network Enhanced Logic) for modifying subscriber data in the HLR, which data may comprise, for example, Call Forwarding, Call Barring etc. Generally, a gsmSCF sends a MAP-ANY-TIME-MODIFICATION request message to the HLR (message A in FIG. 7) when subscription information in the HLR are to be modified. The MAP-ANY-TIME-MODIFICATION request comprises several parameters as content which are used by the HLR for doing the modification. Examples for this content are given below in connection with FIGS. 6a/b. When the modification is done by the HLR in accordance with the information given in the MAP-ANY-TIME-MODIFICATION request message A, a message B MAP-ANY-TIME-MODIFICATION acknowledgment is sent back to the gsmSCF. It is to be noted that the external message gateway entity according to the present invention is configured to use MAP services, such as the MAP-ANY-TIME-MODIFICATION, so that the functions of this service can be used in essentially the same manner as by the gsmSCF.

According to the present invention, when such a MAP service, for example the MAP-ANY-TIME-MODIFICATION service, is used, a new information element (for example, an element indicating modificationRequestForSM-GW) containing registration information related to the external SM-GW is added to the MAP-ANY-TIME-MODIFICATION service request. Furthermore, preferably the address of the external SM-GW is included in the registration procedure, i.e. the transmission of the MAP-ANY-TIME-MODIFICATION request to the HLR. The external SM-GW address can be included either as a new information element or by reusing an existing content of the MAP-ANY-TIME-MODIFICATION request, i.e. a gsmSCF-Address information element. Furthermore, if the external SM-GW can act as either an MSC or an SGSN towards the SMS-GMSC, then the MAP-ANY-TIME-MODIFICATION request F comprises also data indicating this information.

It is to be noted that instead of using the Any Time Modification, a further alternative is to introduce a new MAP service (and application context) for registering (and also deregistering) the external SM-GW address at the HLR.

In addition of the mechanism described above, the SM-GW address in the HLR can be also managed by subscriber data management in the HLR, especially if the address of the external SM-GW is fixed.

Referring to the FIGS. 2a and 3, the SM-GW sends, for example via the J interface in FIG. 1, a MAP-ANY-TIME-MODIFICATION request including registration information and the additional information elements such as SM-GW address to the HLR (step S130 in FIG. 2a and step S5 in FIG. 3).

The HLR stores the received information and responses to the external SM-GW with a MAP-ANY-TIME-MODIFICATION response in correspondence to the MAP-ANY-TIME-MODIFICATION service (step S140 in FIG. 2a, step S6 in FIG. 3). Then, the external SM-GW returns an OK message to the communication control functionality for indicating that the registration is completed and the transmission of messages via the external SM-GW is possible (step S7 in FIG. 3).

When the registration in the HLR is successful, messages to the UE can be forwarded via the external SM-GW without using the MSC or SGSN. For this purpose, the information stored in the HLR during the registration procedure as described above are used for responding to a routing information request from the SMS-GMSC when a message is received from the SMSC, for example (step S150 in FIG. 2a).

Next, a deregistration procedure in the message transmission control method according to the present invention is described in connection with FIGS. 2b and 4.

At any time after the registration procedure, the UE may initiate a deregistration procedure. For this purpose, the UE sends a De-Registration request (for example, a Register request with Expires header having value 0) to the communication control functionality of the access NW system/core NW system 2 (step S210 in FIG. 2b, step S11 in FIG. 4). Similar to the description of FIG. 3, the de-registration process of the UE at the access NW system/core NW system 2 is known to those skilled in the art and thus not described in further detail.

Figure 4:
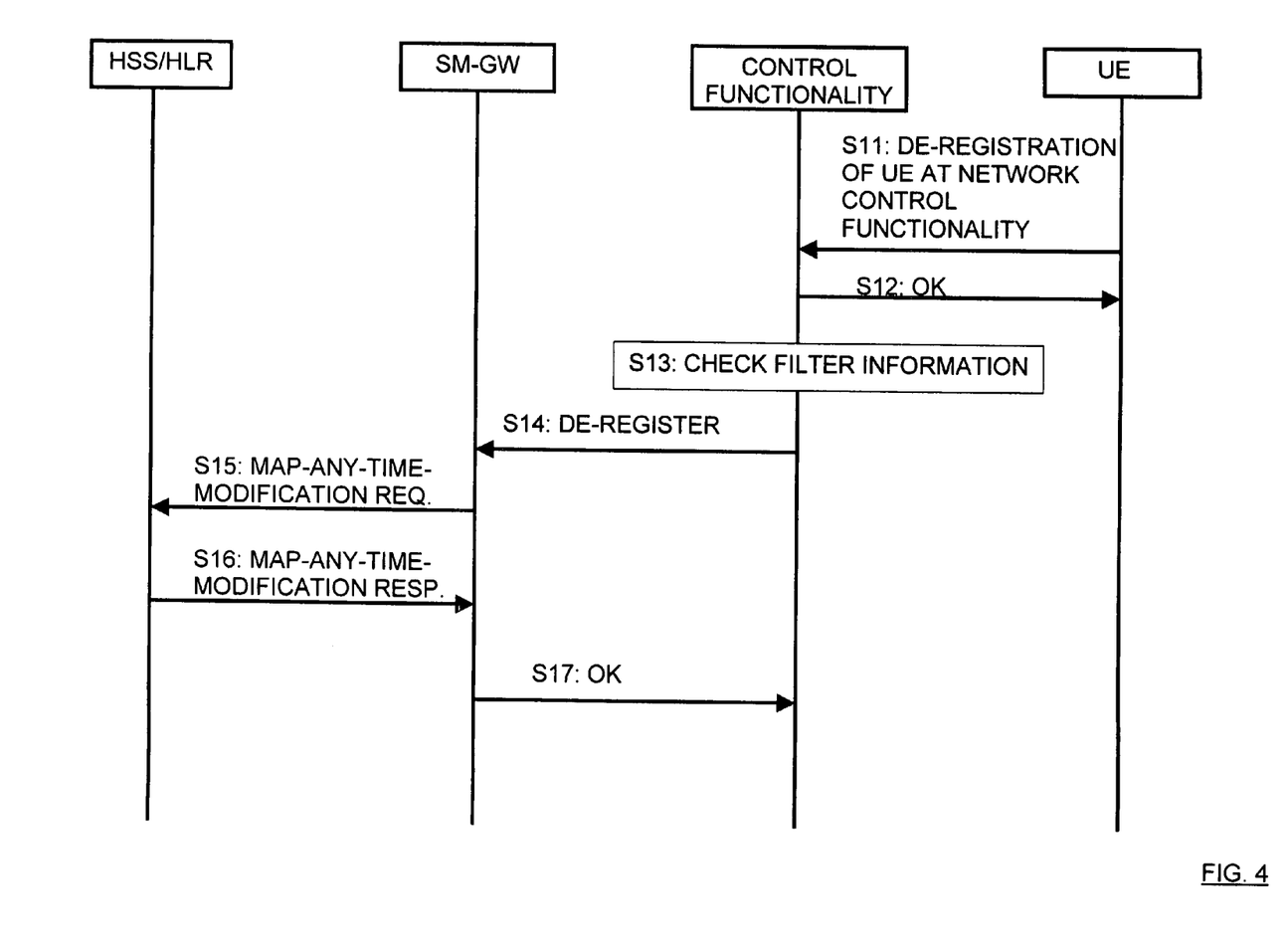
FIG. 4 shows a message flow diagram illustrating the deregistration procedure according to the present invention.

When receiving the de-registration message, the communication control functionality (e.g. S-CSCF) responds to the UE with an OK message (step S12 in FIG. 4). Then, the communication control functionality checks the filter information retrieved from the HSS during the IMS registration procedure (see FIG. 3). Based on the filter information, the communication control functionality informs the external SM-GW about the deregistration of the user (step S14 in FIG. 4).

Figure 2B:
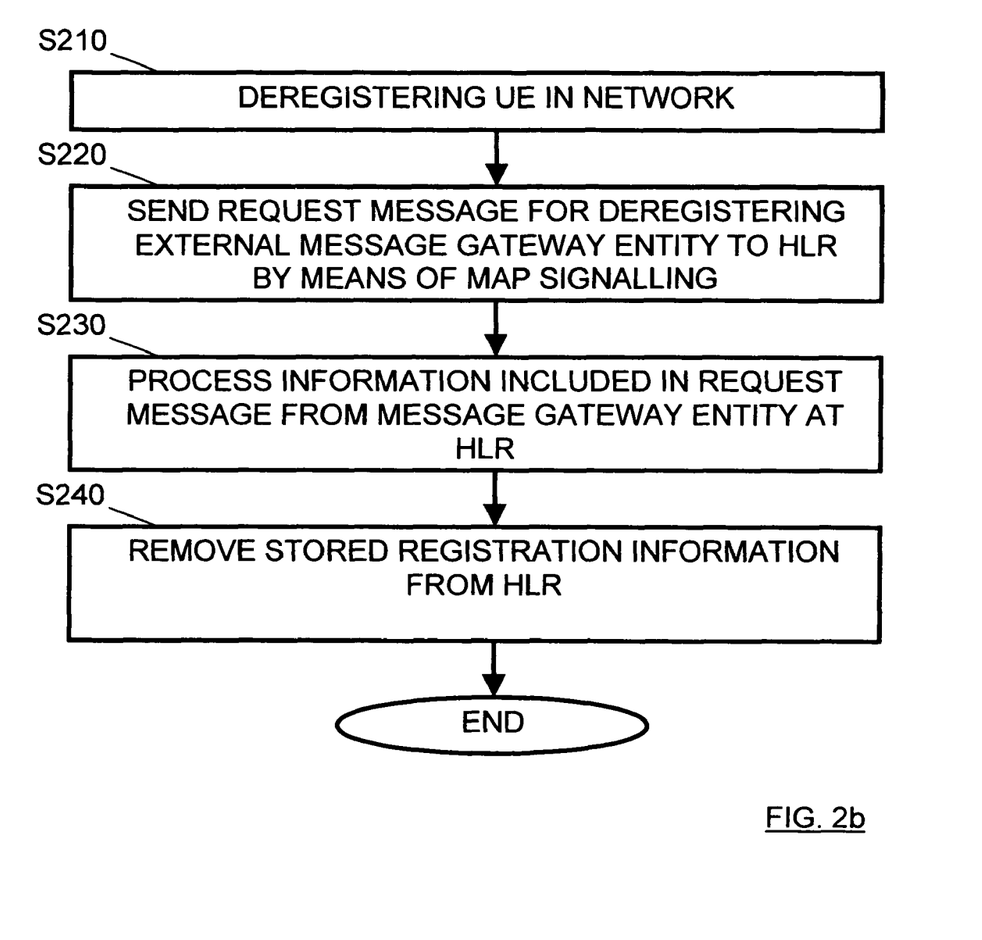
FIG. 2b shows a flow chart illustrating a deregistration procedure used in the mechanism according to the present invention.

The external SM-GW now starts to de-register the UE at the HSS/HLR by sending a corresponding request message to the HSS/HLR (step S220 in FIG. 2b, step S15 in FIG. 4). For this purpose the MAP based service, such as the MAP-ANY-TIME-MODIFICATION service, described in connection with FIG. 3 is used. According to the present invention, when such a MAP service, for example the MAP-ANY-TIME-MODIFICATION service, is used, a new information element (for example, an element indicating modificationRequestFor-SM-GW) containing deregistration information related to the external SM-GW is added to the MAP-ANY-TIME-MODIFICATION service request. Furthermore, the address of the external SM-GW is included, either as a new information element or by reusing an existing content of the MAP-ANY-TIME-MODIFICATION request, i.e. a gsmSCF-Address information element.

It is to be noted that, in correspondence with the registration procedure of FIG. 3, instead of using the Any Time Modification, a further alternative is to introduce a new MAP service (and application context) for deregistering the external SM-GW address at the HLR.

In addition of the mechanism described above, the SM-GW address in the HLR can be also managed by subscriber data management in the HLR, especially if the address of the external SM-GW is fixed.

When the HSS/HLR receives the MAP-ANY-TIME-MODIFICATION request including the deregistration information, it de-registers the UE, i.e. removes the external SM-GW address (steps S230, S240 in FIG. 2b). Then, the HLR responds to the external SM-GW with a MAP-ANY-TIME-MODIFICATION response for acknowledging the deregistration (step S16 in FIG. 4). The external SM-GW then returns an OK message to the communication control functionality of the access NW system/core NW system 2 (step S17 in FIG. 4). Thereafter, the deregistration is completed.

In the following, a delivery of a data message in accordance with the message transmission control mechanism according to the present invention after performing a registration procedure as described in FIGS. 2a and 3 is described in connection with FIG. 5.

Figure 5:
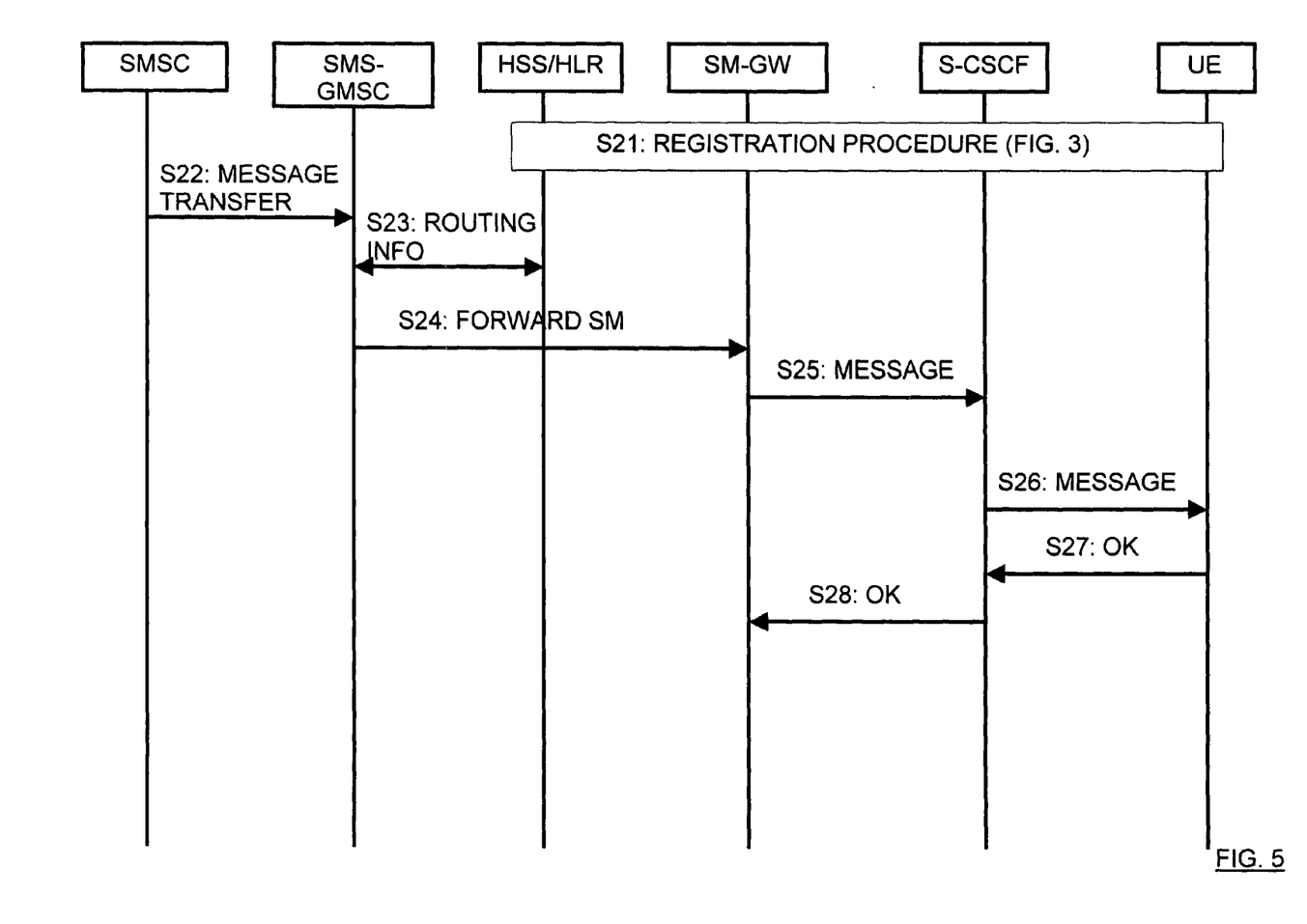
FIG. 5 shows a message flow diagram illustrating a message delivery procedure controlled by the mechanism according to the present invention.

In FIG. 5, in step S21, a registration procedure of the UE and the external SM-GW according to FIG. 3 is executed and completed. Then, a data message, such as a short message SM is sent via the SMSC to the UE as destination. The SMSC forwards the SM to the SMS-GMSC (step S22). The SMS-GMSC interrogates the HSS/HLR to retrieve routing information for the delivery of the SM (step S23).

Since the external SM-GW is registered in the HLR as being part of a transmission path to the UE, the HLR has the possibility to send in addition or instead of an MSC address and an SGSN address the stored external SM-GW address in response to an routing information request. The SM-GW address is included, for example, in a corresponding MAP message MAP-SEND-ROUTING-INFO-FOR-SM Response to the SMS-GMSC. This is achieved by introducing a new information element (for example, sm-gw-Address) to the MAP-SEND-ROUTING-INFO-FOR-SM Response message. If the HLR has also stored the information that the external SM-GW can act as either MSC or SGSN towards the SMS-GMSC (received in the registration procedure according to FIG. 3), then also that information is forwarded to the SMS-GMSC. The HLR should be aware whether the SMS-GMSC supports the receiving of this new information element. For this purpose, a new information element (e.g. sm-gw-SupportIndicator) is needed to be added to the MAP-SEND-ROUTING-INFO-FOR-SM Request message from the SMS-GMSC to the HLR which is recognized by the HLR. If the SMS-GMSC does not support receiving of this new information element, HLR is able to send the SM-GW address in place of either MSC or SGGSN address. Also HLR should be able to return only the address of SM-GW. For this purpose, a new information element (for example sm-gw-NodeIndicator) is introduced to the MAP-SEND-ROUTING-INFO-FOR-SM Response message to indicate that the only address returned (networkNode-Number) contains SM-GW address.

When a user is registered in accordance with the procedure of FIG. 3, the HSS/HLR may return the address of SM-GW along with the address of the MSC. The logic for selecting the preferred route for message delivery is specified, for example, by network operator or the like.

When the SMS-GMSC has received the routing information from the HLR in step S23, the SMS-GMSC can then select the external SM-GW address to be used for forwarding the SM by sending a MAP-MT-FORWARD-SHORT-MESSAGE Request message towards the external SM-GW address. This means the SMS-GMSC delivers the short message to the external SM-GW in the same manner that it delivers the short message to an MSC or SGSN, carrying the MSISDN of the target UE (step S24).

The external SM-GW then can use the TEL-URI of the target UE to populate a SIP Request URI, and then sends the short message using the appropriate SIP method towards the communication control functionality of the access NW system/core NW system 2, e.g. to the S-CSCF (step S25). The access NW system/core NW system 2 forwards the message to the UE (step S26), which in turn responds with an OK message (step S27). The access NW system/core NW system 2 responds then with an OK message to external the SM-GW (step S28).

Preferably, similar kinds of SMS flags for external SM-GW are specified as are defined for MSCs and SGSNs. These flags may comprise MWD (message waiting data), MNRF (mobile not reachable flag), MNRG (mobile not reachable GPRS), MNRR (mobile not reachable reason) and MCEF (memory capacity exceed flag).

It is to be noted that, for example, a MAP service MAP-READY-FOR-SM is used between the external SM-GW and the HLR to indicate that the subscriber has become available for mobile terminated SM sending through the external SM-GW (i.e. contact is established and memory is available).

In FIGS. 6a and 6b, examples for parameters and MAP message contents to be used in the mechanism according to the present invention are shown. In this example, the parameters and message contents specified by 3GPP TS 29.002 V7.2.0 are used as a basis while the changes necessary for implementing the mechanism according to the present invention are marked in the FIGS. 6a and 6b. In particular, the parameters for Any_Time_Modification and also for Send_Routing_Info_For_SM messages are changed. It is to be noted that in the Any_Time_Modification_request according to the example given herein the SM-GW Address is sent in the gsmSCF-Address parameter part.

As described above, the present invention allows the sending of MT-SM via an external SM gateway. It also introduces a mechanism for registering/deregistering the external SM-GW address. Furthermore, the invention proposes to use a MAP service, for example an existing MAP-ANY-TIME-MODIFICATION service, to register the SM-GW address into the HLR. An alternative for using Any Time Modification service would be to introduce a new MAP service (and application context) for registering/deregistering the external SM-GW address.

As described above, a mechanism for controlling a transmission of data messages in a communication network comprises executing a registration procedure, sending a request message including registration information from a message gateway entity to a home subscriber database by using a Mobile Application Part signaling, wherein the request message further comprises additional information elements including registration and address data related to the message gateway entity, storing the registration information and additional information elements in the home subscriber database, and using the stored registration information and additional information elements for responding, by the home subscriber database, to a routing information request for transmitting a data message to a destination connected to the message gateway entity. For a deregistration procedure, a request message including deregistration information is sent from the message gateway entity to the home subscriber database by using the Mobile Application Part signaling, wherein the request message further comprises additional information elements including deregistration data related to the message gateway entity, wherein the stored registration information and additional information elements in the home subscriber database are removed.

It should be understood that the above description and accompanying figures are merely intended to illustrate the present invention by way of example only. The preferred embodiments of the present invention may thus vary within the scope of the attached claims.

The invention claimed is:

1. A method comprising:
receiving a request message including registration information from a message gateway entity by a home subscriber database via Mobile Application Part signaling in association with a registration procedure, wherein the request message further comprises information elements including registration and address data related to the message gateway entity, wherein the message gateway entity is external to a core network of a wireless communications system and is configured to route short message service messages, and wherein the address data related to the message gateway entity is included in the request message as a separate information element or the address data is included in the request message in connection with an existing information element re-used for the message gateway entity related information;
causing the registration information and information elements to be stored in the home subscriber database; and
using the stored registration information and information elements for responding, by the home subscriber database, to a routing information request to cause a data message to be transmitted to a destination connected to the message gateway entity, wherein using the stored registration information and information elements comprises causing the registration information and information elements related to the message gateway element to be sent in response to the request for routing information.

2. The method according to claim 1, further comprising using a MAP-Any-Time-Modification request message as the request message of the Mobile Application Part signaling.

3. The method according to claim 2, wherein the information elements are comprised in a modification request for message gateway entity parameters.

4. The method according to claim 1, wherein the information elements related to the message gateway entity further comprise an information element indicating whether or not the message gateway entity is configured to provide functionalities of a core network control element of a communication network.

5. The method according to claim 1, wherein causing the registration information and information elements to be sent includes causing the registration information and information elements related to the message gateway element to be exclusively sent in response to the request for routing information.

6. The method according to claim 1, wherein using the stored registration information and information elements for responding, by the home subscriber database, to a routing information request for transmitting a data message to a destination connected to the message gateway entity comprises:
causing the registration information and information elements related to the message gateway element and registration information and address data related to at least one core network control element existing in the communication network to be sent, in response to the request for routing information.

7. The method according to claim 1, further comprising:
participating in a deregistration procedure;
receiving a deregistration request message including deregistration information from the message gateway entity by the home subscriber database via Mobile Application Part signaling, wherein the request message further comprises information elements including deregistration data related to the message gateway entity;
causing the stored registration information and information elements in the home subscriber database to be removed; and
causing a response message to the deregistration request message to be sent from the home subscriber database to the message gateway element indicating completion of the deregistration.

8. The method according to claim 7, further comprising using a MAP-Any-Time-Modification request message as the deregistration request message of the Mobile Application Part signaling.

9. The method according to claim 8, wherein the information elements are comprised in a modification request for message gateway entity parameters.

10. The method according to claim 1, wherein the data message is a short message of a short message service.

11. An apparatus comprising at least one processor and at least one memory including computer program code, the at least one memory and the computer program code configured to, with the at least one processor, cause the apparatus at least to:
cause a request message including registration information to be sent from a message gateway entity to a home subscriber database by using Mobile Application Part signaling in association with a registration procedure, the message gateway entity being external to a core network of a wireless communications system and configured to route short message service messages; and
include, in the request message, information elements, the information elements including registration and address data related to a message gateway entity, wherein the address data related to the message gateway entity is included in the request message as a separate information element or the address data is included in the request message in connection with an existing information element re-used for the message gateway entity related information, wherein the registration information and the information elements related to the message gateway element are provided to the home subscriber database to permit storage of the registration information and the information elements in the home subscriber database and usage of the stored registration information and information elements for responding, by the home subscriber database, to a routing information request to cause a data message to be transmitted to a destination connected to the message gateway entity, wherein usage of the stored registration information and information elements comprises causing the registration information and information elements related to the message gateway element to be sent in response to the request for routing information.

12. The apparatus according to claim 11, wherein the apparatus is caused to use a MAP-Any-Time-Modification request message as the request message via Mobile Application Part signaling.

13. The apparatus according to claim 12, wherein the apparatus is caused to include the information elements in a modification request for message gateway entity parameters.

14. The apparatus according to claim 11, wherein the apparatus is caused to introduce into the information elements related to the message gateway entity an information element indicating whether or not the message gateway entity is configured to provide functionalities of a core network control element of a communication network.

15. The apparatus according to claim 11, wherein the apparatus is further caused to:
participate in a deregistration procedure;
cause a deregistration request message including deregistration information to be sent to the home subscriber database by using Mobile Application Part signaling, wherein the deregistration request message further comprises information elements including deregistration data related to the message gateway entity; and
receive a response message to the request message from the home subscriber database indicating completion of the deregistration.

16. The apparatus according to claim 15, wherein the apparatus is further caused to use a MAP-Any-Time-Modification request message as the deregistration request message of the Mobile Application Part signaling.

17. The apparatus according to claim 16, wherein the apparatus is caused to include the information elements in a modification request for message gateway entity parameters.

18. The apparatus according to claim 11, wherein the data message is a short message of a short message service.

19. An apparatus comprising at least one processor and at least one memory including computer program code, the at least one memory and the computer program code configured to, with the at least one processor, cause the apparatus at least to:
receive a request message including registration information from a message gateway entity by a home subscriber database via Mobile Application Part signaling in association with a registration procedure, wherein the request message further comprises information elements including registration and address data related to the message gateway entity, wherein the message gateway entity is external to a core network of a wireless communications system and is configured to route short message service messages, and wherein the address data related to the message gateway entity is included in the request message as a separate information element or the address data is included in the request message in connection with an existing information element re-used for the message gateway entity related information;
cause the registration information and information elements to be stored in the home subscriber database; and
use the stored registration information and information elements for responding, by the home subscriber database, to a routing information request to cause a data message to be transmitted to a destination connected to the message gateway entity, wherein being caused to use the stored registration information and information elements includes being directed to cause the registration information and information elements related to the message gateway element to be sent in response to the request for routing information.

20. The apparatus according to claim 19, wherein a MAP-Any-Time-Modification request message is used as the request message of the Mobile Application Part signaling.

21. The apparatus according to claim 20, wherein the information elements are comprised in a modification request for message gateway entity parameters.

22. The apparatus according to claim 19, wherein the apparatus is caused to recognize from a part of the information elements related to the message gateway entity whether or not the message gateway entity is configured to provide functionalities of a core network control element of a communication network.

23. The apparatus according to claim 19, wherein the apparatus caused to use the stored registration information and information elements includes being directed to cause the registration information and information elements related to the message gateway element to be sent exclusively in response to the request for routing information.

24. The apparatus according to claim 23, wherein the apparatus is caused to send, in response to the request for routing information, an information that the message gateway element is adapted to provide functionalities of a core network control element of a communication network if this is recognized from the part of the information elements related to the message gateway entity.

25. The apparatus according to claim 19, wherein the apparatus is caused to send the registration information and information elements related to the message gateway element in response to the request for routing information and registration information and address data related to at least one core network control element existing in the communication network, in response to the request for routing information.

26. The apparatus according to claim 19, wherein the apparatus is further caused to:
execute a deregistration procedure;
receive a deregistration request message including deregistration information from the message gateway entity via Mobile Application Part signaling, wherein the deregistration request message further comprises information elements including deregistration data related to the message gateway entity;
remove the stored registration information and information elements; and
cause a response message to be sent to the message gateway element indicating completion of the deregistration.

27. The apparatus according to claim 26, wherein a MAP-Any-Time-Modification request message is used as the deregistration request message of the Mobile Application Part signaling.

28. The apparatus according to claim 27, wherein the information elements are comprised in a modification request for message gateway entity parameters.

29. The apparatus according to claim 19, wherein the data message is a short message of a short message service.

30. A method comprising:
causing, via a processor, a request message including registration information to be sent from a message gateway entity to a home subscriber database by using Mobile Application Part signaling in association with a registration procedure, the message gateway entity being external to a core network of a wireless communications system and configured to route short message service messages; and
including in the request message information elements, the information elements including registration and address data related to a message gateway entity, wherein the address data related to the message gateway entity is included in the request message as a separate information element or the address data is included in the request message in connection with an existing information element re-used for the message gateway entity related information, wherein the registration information and the information elements related to the message gateway element are provided the home subscriber database to permit storage of the registration information and the information elements in the home subscriber database and usage of the stored registration information and information elements for responding, by the home subscriber database, to a routing information request to cause a data message to be transmitted to a destination connected to the message gateway entity, wherein usage of the stored registration information and information elements comprises causing the registration information and information elements related to the message gateway element to be sent in response to the request for routing information.

31. The method according to claim 30, further comprising including the address data related to the message gateway entity in the request message in connection with an existing information element re-used for the message gateway entity related information.

32. The method according to claim 30, wherein causing the request message to be sent to the home subscriber database includes causing the request message to be sent to the home subscriber database, the home subscriber database comprising a home location register, wherein the home location register is associated with a separate network entity than a home subscriber server.

33. A computer readable memory having a computer program embodied thereon, the computer program comprising software code portions configured to control a processor to execute:
    causing a request message including registration information to be sent from a message gateway entity to a home subscriber database by using Mobile Application Part signaling in association with a registration procedure, the message gateway entity being external to a core network of a wireless communications system and configured to route short message service messages; and
    including in the request message information elements including registration and address data related to the message gateway entity control element usable for controlling a call management for a subscriber, wherein the address data related to the message gateway entity is included in the request message as a separate information element or the address data is included in the request message in connection with an existing information element re-used for the message gateway entity related information, wherein the registration information and the information elements related to the message gateway element are provided to the home subscriber database to permit storage of the registration information and the information elements in the home subscriber database and usage of the stored registration information and information elements for responding, by the home subscriber database, to a routing information request to cause a data message to be transmitted to a destination connected to the message gateway entity, wherein usage of the stored registration information and information elements comprises causing the registration information and information elements related to the message gateway element to be sent in response to the request for routing information.

34. A computer readable memory having a computer program embodied thereon, the computer program comprising software code portions configured to control a processor to execute:
    receiving a request message including registration information from a message gateway via Mobile Application Part signaling, wherein the request message further comprises information elements including registration and address data related to the message gateway entity, wherein the message gateway entity is external to a core network of a wireless communications system and is configured to route short message service messages, and wherein the address data related to the message gateway entity is included in the request message as a separate information element or the address data is included in the request message in connection with an existing information element re-used for the message gateway entity related information;
    causing the registration information and information elements for executing a registration procedure to be stored; and
    using the stored registration information and information elements for responding to a routing information request to cause a data message to be transmitted to a destination connected to the message gateway entity, wherein using the stored registration information and information elements comprises causing the registration information and information elements related to the message gateway element to be sent in response to the request for routing information.

* * * * *